Nov. 19, 1963 R. R. WALSH 3,111,669

OMNIDIRECTIONAL SIGNAL RECEIVING SYSTEM

Filed Nov. 25, 1960 2 Sheets-Sheet 1

INVENTOR.
Robert R. Walsh.
BY
Herbert M. Birch

INVENTOR.
Robert R. Walsh
BY
Herbert M. Birch

United States Patent Office 3,111,669
Patented Nov. 19, 1963

3,111,669

OMNIDIRECTIONAL SIGNAL RECEIVING SYSTEM

Robert R. Walsh, Wilmington, Del., assignor to All American Engineering Company, Wilmington, Del., a corporation of Delaware Filed Nov. 25, 1960, Ser. No. 71,608
17 Claims. (Cl. 343—100)

This invention relates to omnidirectional signal receiving systems.

With the advent of FM receivers for vehicles a decided problem has arisen for the proper reception of FM signals at the vehicle.

Since the commercial FM broadcast is transmitted from a horizontally polarized antenna, the electric component is horizontally polarized and the magnetic component is vertically polarized. The electric component being the one normally received, the best prior antenna design for the reception of an FM wave is the quarter wave length horizontal dipole of the type commonly used for the reception of television broadcast signals.

The use of this type of antenna, however, gives rise to a serious problem in that the horizontal polarization of the electric field vector causes this means of reception to be highly directional. Of course, in vehicular applications with a constantly moving receiver, this feature is highly undesirable. In addition, this particular type of antenna is of such size as to make it unsuitable for use on any normal sized vehicles such as automobiles.

In order to meet the directional and size problems, the present day practice is to use the ordinary vertical whip type of automotive antenna which is designed for vertically polarized AM reception. This results in omnidirectional reception and an antenna of suitable size but the results are accomplished at the expense of the efficiency of signal reception.

For non-automotive applications the size and directional problems are not always so acute but it would be highly desirable to eliminate the necessity for directional adjustment and cumbersome size.

It is, therefore, a primary object of this invention to provide an omnidirectional signal receiving system which is capable of operating as both an AM and FM signal receiving means.

Another object of this invention is to provide an omnidirectional signal receiving system having antenna means capable of receiving the vertically polarized magnetic field component of a standard FM wave and also the vertically polarized electric field component of a standard AM wave.

Another object of this invention is to provide an omnidirectional signal receiving system having a highly compact antenna capable of being mounted internally of the passenger space of a motor vehicle.

Still another object of this invention is to provide an omnidirectional signal receiving system for automotive vehicles having an antenna structure readily mountable on the vehicle.

Still another object of this invention is to provide an omnidirectional automotive antenna structure combined with a rear-view vehicle mirror.

These and other objects of this invention will become apparent with reference to the following specification and drawings which disclose several preferred embodiments of the invention.

*The Antenna*

The antenna of the present invention is basically a loop antenna wound on a ferrite core, with the core being disposed in a vertical direction to effectively intercept the vertically polarized magnetic field vector of a horizontally polarized FM wave.

Referring first to FIGURES 1 through 5, the antenna is shown to comprise a pair of equal coil windings 10 and 12 wound in opposition and disposed on a ferrite core 14. These coil windings 10 and 12 cover substantially ninety (90) percent of the total length of the core 14.

Figures 1, 2, 3, 4, 5:
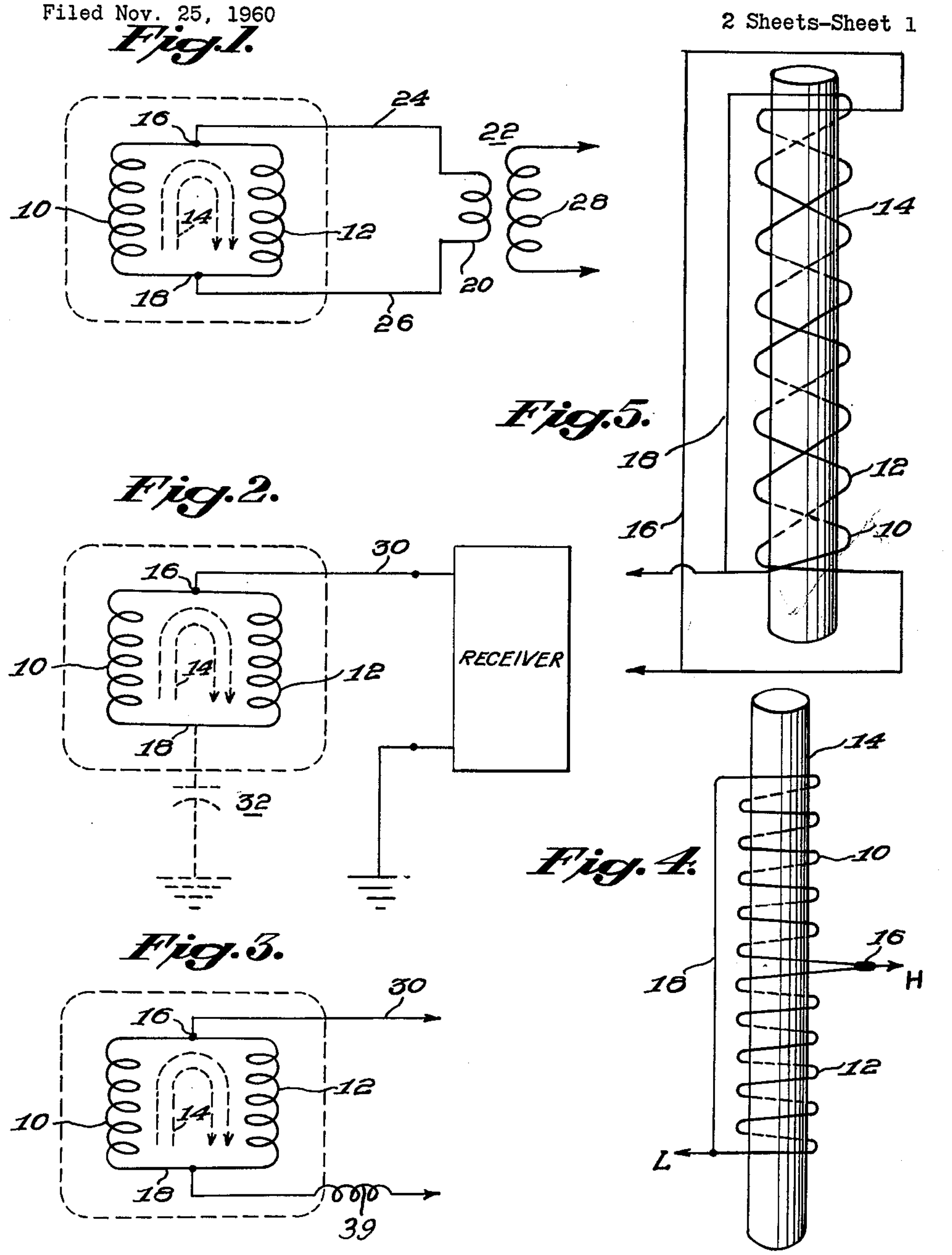
FIGURE 1 is a schematic diagram of one embodiment of the invention.
FIGURE 2 is a schematic diagram of another embodiment of the invention.
FIGURE 3 is a schematic diagram of still another embodiment of the invention.
FIGURE 4 is a diagrammatic showing of a physical embodiment of an antenna as shown diagrammatically in FIG. 2.
FIGURE 5 is a diagrammatic showing of a physical embodiment of an antenna as shown diagrammatically in FIGURE 1.

The opposing extremities of the coil windings 10 and 12 are interconnected by common connections 16 and 18 to provide a parallel connection of the two coils 10 and 12 as shown in FIGURES 1 and 2 with the magnetic flux of the combination in mutually aiding relationship. Since the coils are oppositely wound the magnetic flux intercepted by the ferrite core 14 causes current to circulate through the parallel loop connection in opposite directions with respect to each individual coil, the consequent voltages induced therein are opposed and tend to maintain the terminals or common connections 16 and 18 as points of opposite polarity.

In the embodiment of FIGURE 4, the opposed coil windings 10 and 12 are wound in end to end relationship along the ferrite core member 14. The common connection 16 is made between adjacent coil ends while the common connection 18 is between the extreme ends of the coil.

In the embodiment of FIGURE 5, the coil windings 10 and 12 are interdispersed along the length of the ferrite core member 14 with the common connections 16 and 18 being made between alternate opposing ends, respectively, of the two coils.

The ferrite rod or other suitable shape making up the core member 14 of the antenna must be of a material having useful permeability and Q at the frequencies encompassed within the FM transmission band. Since the commercial FM band, including educational broadcast band channel allotments runs from channel No. 201 on 88.1 megacycles to channel No. 300 on 107.9 megacycles, a minimum initial permeability of 10 and a minimum permissible Q of 20 at 150 megacycles is preferred. For example, such a material is manufactured by the General Ceramics Corporation and is designated "Q–3."

With respect to the rod type core 14 used in FIGURES 4 and 5 the length-to-diameter ratio should be consistent with good magnetic antenna design and a value of not less than 8 has been found to be satisfactory. The cross sectional area should also be as large as is practical and a value of 0.196 square inch has been found to be suitable for use with the above enumerated length-to-diameter ratio. More signal may be intercepted by making the core 14 hollow but larger in diameter. This permits maintaining the same effective length-to-diameter ratio with a certain saving of material.

*The Receiving System*

Referring first to FIGURE 1, the coil windings 10 and 12 are shown as being connected from the common terminals 16 and 18 thereof to the primary 20 of an input transformer 22 by a pair of leads 24 and 26, respectively. The secondary 28 of the transformer 22 is connected across the input terminals of a radio receiver, not shown.

In the embodiment of FIGURE 2, one of the common terminals 16 is connected via a lead 30 to an input terminal of a receiver (not shown) while the other common terminal 18 is effectively connected to the receiver by way of a common ground path. The common ground path is provided by way of stray capacitance coupling 32 resulting in the necessity for only one antenna terminal instead of the conventional two and producing an impedace compensation matching the antenna to the transmission line.

A modification of the circuit is shown in FIGURE 3, wherein the lead 30 is connected to one terminal of the antenna, the other terminal thereof is connected to the antenna return through a coil 39. The common ground path between the antenna and the transmission line through the coil 39 provides an alternative impedance compensation method to match antenna to transmission line at the expense of the AM reception feature.

Referring back to FIGURE 2, a preferred physical embodiment of this system comprises utilizing a single shielded conductor as the connecting lead 30 which runs between the antenna terminal 16 and the antenna input terminal (not shown) on the receiver. Normally, the terminal 18 would be connected to the shield of the conductor 30 to provide a return connection to the antenna from the antenna terminals at the receiver. However, in this embodiment the conventional return circuit remains open. The novel return circuit forming a part of this invention is a ground return circuit completed through stray capacitance between the antenna and ground.

That the subject antenna is, in fact, a loop antenna operating on interception of the magnetic vector of a signal may be first demonstrated by removing the ferrite core 14 from the coil windings 10 and 12. The removal of the core 14 causes an immediate and drastic reduction of received signal strength as measured at the receiver input.

Since in the disclosed embodiments the disclosed connection of the coil windings 10 and 12 constitute a single closed circuit or loop, the magnetic operating properties of the antenna may be further demonstrated. By opening one of the common connections such as 18 between the two coils, the measured signal at the receiver input is again drastically reduced indicating that a closed loop is necessary for proper operation. In fact, the signal reduction in this example is much more drastic than the signal reduction in the previous example.

The increased reduction in signal is attributed to complete breaking of the loop whereby no current flow can be induced therein by an intercepted magnetic field component. Thus, magnetic operation is definitely established since breaking the loop would have little or no effect on received signal strength from an intercepted electric field signal component.

Values such as the number of turns per coil winding are found to be critical in obtaining maximum signal reception. Since the commonly used transmission line between the antenna and receiver in an automobile has an impedance of 50 ohms and most standard automobile radio receivers have a 50 ohm input impedance to match the line an optimum number of turns for this operation is four (4) turns per coil for the coil of the above specified dimensions. Deviations of plus or minus more than one turn causes serious reduction in received signal strength and impedance compensation as shown in FIGURES 2 and 3 must be used to match the antenna to different input impedances.

All of the previous examples and discussion relative thereto are based on the reception of frequencies in the FM broadcast band of frequencies.

An additional and important novel feature of this invention is the ability of the embodiment of the system in FIGURE 2 to receive AM signals throughout the range of signal frequencies in the AM broadcast band.

When the received signals are in the AM frequency band, the signals are vertically polarized and the antenna is properly positioned for picking up the electric field component of the signal. In this frequency range the stray capacitance coupling effect 32 is negligible and the antenna is thus connected as a vertical or whip antenna in the receiving system reinforced by magnetic loading as disclosed in U.S. Patent 2,748,386.

Electric pick-up is minimized in the FM frequency band since the antenna is a true loop over this band width and is wound in opposition to cancel any electric effect at these frequencies.

*Adaptation to Vehicles*

The compact size and shape of the antenna of this invention makes possible its adaptability to automotive vehicles in a manner heretofore impossible if both compactness and adequate signal reception are concurrent criteria.

Figure 6:
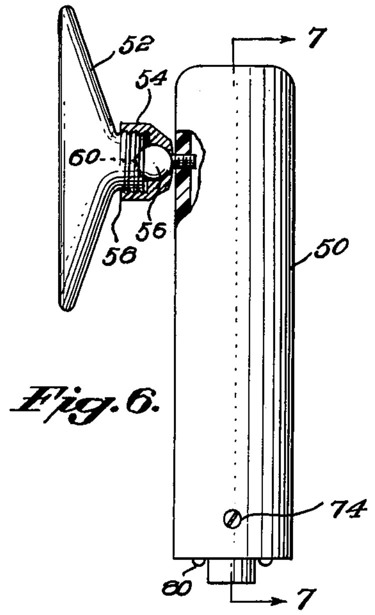
FIGURE 6 is an elevation in partial cross-section of an antenna and automotive rear-view mirror combination as included in the present invention.

One unique structure made possible by this invention is shown in FIGURE 6 wherein the entire antenna is housed within a supporting post 50 of a rear view mirror 52. The mirror 52 is attached to the supporting post 50 by means of threaded collar 54 loosely coupled with a fixed ball joint 56, which cooperates with a threaded nipple 58 on the mirror 52 to seat the ball 56 firmly in a socket 60 in the end of the nipple 58. Thus, universal adjustment of the mirror 52 with respect to the supporting post and antenna housing 50 is provided.

Figure 8:
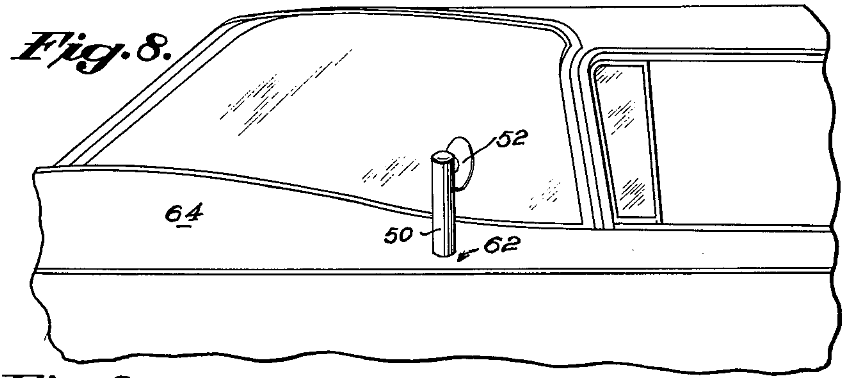
FIGURE 8 is a general showing of the embodiment of FIGURE 6 mounted on an exterior body portion of a vehicle.
Figure 9:
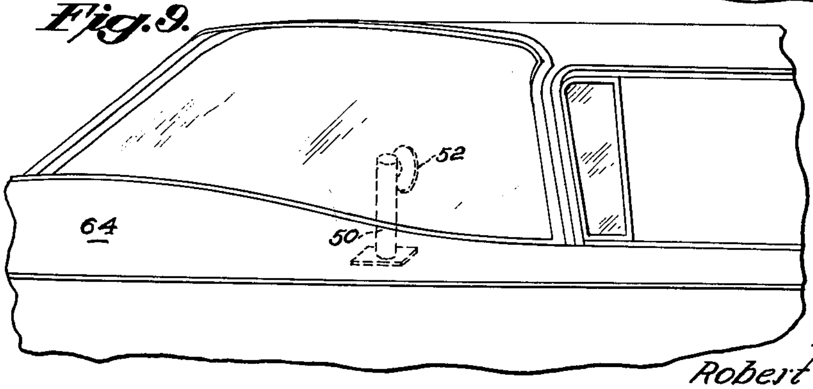
FIGURE 9 is a general showing of the embodiment of FIGURE 6 mounted internally with respect to the passenger compartment of a vehicle.

As shown in FIGURES 8 and 9, the antenna-mirror combination 50—52 by virtue of the properties of the antenna contained therein can be mounted on the exterior surface 62 of an automobile 64 or the like or can be mounted within the passenger compartment of the vehicle 64 by supporting the combination from a dashboard 66 thereof. The combination can also be mounted on the roof or rear window ledge. Also, the antenna may be mounted alone in addition to the conventional rear view mirrors of a vehicle.

Figure 7:
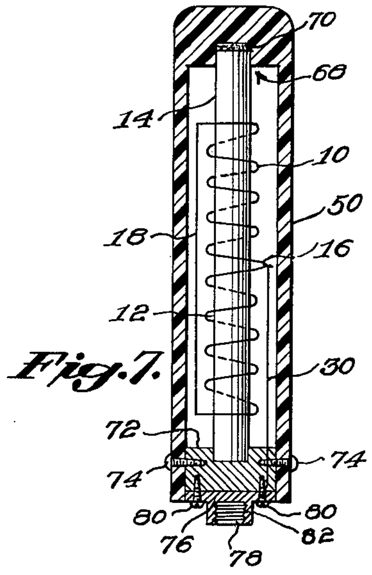
FIGURE 7 is a cross sectional elevation taken along line 7—7 of FIGURE 6.

The antenna housing 50 is shown in cross-section in FIGURE 7 as comprising a protective cover, such as a plastic or other non-conductive material in the form of a hollow cylinder open at one end enclosing the preferred embodiment of the antenna shown in FIGURE 2. The closed end is counterbored as shown at 68 and then partially filled with foamed plastic or other cushioning material 70. The ferrite core 14 with the coil windings 10 and 12 thereon is then placed in the cylinder 50 with one end thereof seated against the cushion 70 in the counterbore 68.

The lower end of the antenna core 14 is seated in a dielectric counterbored cylindrical plug 72 which is inserted in the open end of the cylinder 50 and fastened therein by a plurality of screws 74 or the like.

A brass or other conductive material base 76 with an integral threaded socket 78 is held in juxtaposition with the plug 72 by a plurality of screws 80 or the like. The antenna lead 30 extending from the common terminal 16 of the antenna is electrically connected with the conductive base 76 at a point 82 whereby the base serves as both a physical mounting means and an electrical connection by which received signals are fed into a radio receiver on the vehicle. The connection from the base 76 to the receiver is not shown.

As can be seen from the foregoing specification and drawings this invention provides an omnidirectional signal receiving system of highly desirable and unusual combined properties.

The system of the invention is completely omnidirectional with respect to the reception at a moving vehicle of both AM and FM signals and at the same time is so compact as to be readily positioned within the passenger compartment of a vehicle. The compactness of structure permits the antenna of the invention to be positioned within a protective housing which doubles as a support for an internal or external rear view mirror on the vehicle.

As to specific size, the length of the entire assembly shown in FIGURE 7 is between seven (7) and eight (8) inches. This provides for the reception of both AM and FM signals.

It is to be understood that the embodiments disclosed by the foregoing specification and drawings are for the purpose of example only and are not intended to limit the scope of the appended claims.

What is claimed:

1. A signal receiving system for omnidirectional reception of horizontally polarized FM signals comprising a vertically disposed elongated core of magnetic material, a pair of coil windings on said core wound in opposition and connected in parallel to provide a pair of common terminals therebetween, the pair of said common terminals being connected to the input terminals of a receiver, and impedance matching means between said common terminals and said input terminals.

2. A signal receiving system according to claim 1, wherein said impedance matching means includes an inductance coil inserted in series with one of said common terminals and one of said input terminals.

3. The invention defined in claim 1 wherein said impedance matching means comprises an input transformer, said input transformer having a primary winding connected between said common terminals.

4. The invention defined in claim 1 wherein said pair of coil windings extend from one of said common terminals at a point midway between the ends of said core in respectively opposite directions to the outer ends of said core, the outer ends thereof being joined together at the other of said common connections.

5. The invention defined in claim 1 wherein said pair of coil windings extend from one end of said core to the other in overlapping relationship, said common terminals comprising a pair of connections joining mutually opposite ends of said pair of coils.

6. In a signal receiving system, an antenna for omnidirectional reception of the magnetic component of a horizontally polarized signal comprising a vertically disposed elongated core of magnetic material, a pair of coil windings wound on said core, a single common output terminal for said antenna intermediate the ends of said core, said windings being wound in opposition and extending from said common output terminal intermediate the ends of said core in opposite directions to respective positions adjacent the ends of said core, and a common connection extending from the outer end of one of said coils to the outer end of the other whereby said coils are connected in parallel and wound in opposition to provide mutually aiding voltages induced therein by the interception of said magnetic component but which act to cancel electrostatic interference intercepted thereby.

7. In a signal receiving system, an antenna for omnidirectional reception of the magnetic component of a horizontally polarized signal comprising a vertically disposed elongated core of magnetic material, a pair of coil windings wound on said core, said windings being wound in opposition and extending from one end of said core to the other in overlapping relationship, and mutually opposite ends of said coils being electrically interconnected to provide a pair of common connections, whereby said coils are connected in parallel and wound in opposition to provide mutually aiding voltages induced therein by the interception of said magnetic component but which act to cancel electrostatic interference intercepted thereby.

8. In a signal receiving system, an antenna including means for connecting said antenna as a loop in response to a first band of signal frequencies and automatically connecting said antenna as a vertical antenna in response to a second band of signal frequencies whereby said antenna is responsive to the magnetic signal component in said first band of frequencies and the electric signal component in said second band of frequencies.

9. In a signal receiving system, an antenna including means for connecting said antenna as a loop in response to a first band of signal frequencies and automatically connecting said antenna as a vertical antenna in response to a second band of signal frequencies whereby said antenna is responsive to the magnetic signal component in said first band of frequencies and the electric signal component in said second band of frequencies in which the vertical antenna is magnetically loaded.

10. The invention as defined in claim 8 wherein said means comprises a capacitance coupling providing a shunt connection throughout said first band of frequencies and an open circuit throughout said second band of frequencies.

11. A signal receiving system including a radio receiver having a common ground circuit and signal input terminals, an antenna having a pair of common terminals thereon, one of said common terminals being connected to a signal input terminal of said receiver, and means at the other of said common terminals for connecting said antenna as a loop antenna through said ground circuit to said receiver in response to a first band of signal frequencies and automatically connecting said antenna as a vertical antenna in response to a second band of signal frequencies, whereby said system is responsive to the magnetic signal component in said first band of frequencies and the electrical signal component in said second band of frequencies.

12. The invention as defined in claim 11 wherein said means comprises a capacitance coupling providing a shunt connection from said other common terminal to said ground circuit throughout said first band of frequencies and an open circuit between said common terminal and ground throughout said second band of frequencies.

13. In a signal receiving system including an antenna comprising an elongated core member with a plurality of coil windings thereon, means for supporting and housing said antenna comprising, an elongated hollow protective shell for internally receiving said antenna, a closed end on said shell having an internal counterbore therein of sufficient size to receive one end of said core, an insert in said counterbore of shock-absorbing material to cushion said core from shocks imparted to said shell, a counterbored plug means removably insertable in said shell to receive and secure the other end of said core therein, and an electrically conductive base member having means thereon electrically interconnected with said coil windings in juxtaposition with said plug including an external electric terminal connection and mounting means for said antenna housing.

14. A signal receiving system for omnidirectional reception of vertically polarized AM and horizontally polarized FM signals including a radio receiver having a common ground circuit and signal input terminals and an antenna comprising a vertically disposed elongated core of magnetic material, a pair of coil windings on said core wound in opposition and connected in parallel to provide a pair of common terminals therebetween, one of said common terminals being connected to an input terminal of said radio receiver, the other of said terminals being coupled to the common ground circuit of said receiver by stray capacitance in the FM frequency band and open circuited with respect to ground in the AM frequency band whereby said antenna is energized by the magnetic component of an FM signal and the electric component of an AM signal.

15. A signal receiving system for omnidirectional reception of horizontally polarized FM signals comprising a vertically disposed elongated core of magnetic material, a pair of coil windings on said core wound in opposition and connected in parallel to provide a pair of common terminals therebetween, the pair of said common terminals being connected to the input terminals of a receiver, and impedance matching means between said common terminals and said input terminals wherein one of said common terminals is open circuited providing stray capacitance coupling between said one terminal and ground as said impedance matching means.

16. In a signal receiving system for vehicle mounted radio receivers, a combined rear view vehicle mirror and antenna means for omnidirectional reception of the magnetic component of a horizontally polarized signal comprising a hollow vertically disposed protective shell having internal means for supporting said antenna and external means for supporting said mirror, said antenna including a vertically disposed elongated core of magnetic material and a pair of coil windings on said core wound in opposition and connected in parallel, said core being supported by said internal means internally of said protective shell whereby no antenna structure is visible on the vehicle.

17. The invention defined in claim 13, wherein said core member is vertically disposed in said protective shell and composed of magnetic material and said coil windings comprise an oppositely wound pair of windings connected in parallel, whereby said signal receiving system is made omnidirectional with respect to horizontally polarized signals.

References Cited in the file of this patent

UNITED STATES PATENTS

| | | |
|---|---|---|
| 1,589,344 | Akers | June 22, 1926 |
| 2,354,332 | Polydoroff | July 25, 1944 |
| 2,690,509 | Toth | Sept. 28, 1954 |
| 2,964,746 | Trudnak | Dec. 13, 1960 |